US010972506B2

United States Patent
Arumugam et al.

(10) Patent No.: US 10,972,506 B2
(45) Date of Patent: *Apr. 6, 2021

(54) POLICY ENFORCEMENT FOR COMPUTE NODES

(71) Applicant: Microsoft Technology Licensing, LLC, Redmond, WA (US)

(72) Inventors: Dilli Dorai Minnal Arumugam, Campbell, CA (US); Prasad Mujumdar, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 552 days.

This patent is subject to a terminal disclaimer.

(21) Appl. No.: 15/862,528

(22) Filed: Jan. 4, 2018

(65) Prior Publication Data

US 2018/0131726 A1 May 10, 2018

Related U.S. Application Data

(63) Continuation of application No. 14/965,055, filed on Dec. 10, 2015, now Pat. No. 9,871,825.

(51) Int. Cl.
*G06F 21/00* (2013.01)
*H04L 29/06* (2006.01)

(52) U.S. Cl.
CPC .............. *H04L 63/20* (2013.01); *H04L 63/08* (2013.01); *H04L 63/101* (2013.01); *H04L 63/104* (2013.01)

(58) Field of Classification Search
CPC ....... H04L 63/20; H04L 63/101; H04L 63/08; H04L 63/104
See application file for complete search history.

(56) References Cited

U.S. PATENT DOCUMENTS 5,537,548 A  7/1996 Fin
5,708,780 A  1/1998 Levergood
(Continued)

FOREIGN PATENT DOCUMENTS

WO  WO 2014/207554  12/2014

OTHER PUBLICATIONS

"Final Office Action Issued in U.S. Appl. No. 16/397,750", dated Jan. 21, 2020, 23 Pages.

(Continued)

*Primary Examiner* — Kendall Dolly
(74) *Attorney, Agent, or Firm* — Fiala & Weaver P.L.L.C.

(57) ABSTRACT

Methods, systems, and apparatus, including computer programs encoded on computer storage media, for maintaining, by a policy enforcement system in a first compute node, a plurality of policies and data associating a plurality of user credentials with the plurality of policies. A request is received from a compute process for data from a file system in the first compute node. The request includes user credentials. The request for data is sent to the file system, and the data is received from the file system. Based on the received user credentials and the data associating the plurality of user credentials with the plurality of policies, one or more policies that correspond to the received user credentials is selected from the plurality of policies. The policy enforcement system filters the data from the file system based on the one or more policies, and sends the filtered data to the compute process.

20 Claims, 3 Drawing Sheets

(56) References Cited

U.S. PATENT DOCUMENTS

| | | |
|---|---|---|
| 6,178,505 B1 | 1/2001 | Schneider et al. |
| 6,226,372 B1 | 5/2001 | Beebe |
| 6,463,470 B1 | 10/2002 | Mohaban |
| 6,687,229 B1 | 2/2004 | Kataria |
| 6,799,214 B1 | 9/2004 | Li |
| 7,215,637 B1 | 5/2007 | Ferguson et al. |
| 7,542,943 B2 | 6/2009 | Caplan |
| 7,631,084 B2 | 12/2009 | Thomas |
| 7,730,089 B2 | 6/2010 | Campbell |
| 8,181,221 B2 | 5/2012 | Manickam et al. |
| 8,185,931 B1 | 5/2012 | Reeves |
| 8,196,183 B2 | 6/2012 | Smith |
| 8,613,108 B1 | 12/2013 | Aggarwal |
| 8,677,447 B1 | 3/2014 | Zuk et al. |
| 8,683,560 B1 | 3/2014 | Brooker |
| 8,769,692 B1 | 7/2014 | Muttik |
| 8,930,410 B2 | 1/2015 | Alton et al. |
| 8,959,629 B2 | 2/2015 | Scholte |
| 8,984,608 B2 | 3/2015 | Sanno |
| 9,069,436 B1 | 6/2015 | Fieweger |
| 9,071,594 B2 | 6/2015 | Boulos et al. |
| 9,183,407 B2 | 11/2015 | Meijer |
| 9,576,147 B1 | 2/2017 | McClintock |
| 9,584,517 B1 | 2/2017 | Roth |
| 9,614,715 B2 | 4/2017 | Bhave |
| 9,722,895 B1 | 8/2017 | Sarukkai |
| 9,866,592 B2 | 1/2018 | Arumugam et al. |
| 9,871,825 B2 | 1/2018 | Arumugam et al. |
| 10,277,633 B2 | 4/2019 | Arumugam et al. |
| 10,803,027 B1 | 10/2020 | Rodgers et al. |
| 2001/0023486 A1 | 9/2001 | Kayashinna |
| 2002/0007404 A1 | 1/2002 | Vange |
| 2002/0019828 A1 | 2/2002 | Mortl |
| 2002/0157023 A1 | 10/2002 | Callahan |
| 2002/0169907 A1 | 11/2002 | Candea |
| 2002/0184535 A1 | 12/2002 | Moaven et al. |
| 2003/0018786 A1 | 1/2003 | Lortz |
| 2003/0021283 A1 | 1/2003 | See |
| 2003/0046315 A1 | 3/2003 | Feig |
| 2003/0074580 A1 | 4/2003 | Knouse et al. |
| 2003/0081621 A1 | 5/2003 | Godfrey |
| 2003/0115322 A1 | 6/2003 | Moriconi |
| 2003/0229848 A1 | 12/2003 | Arend |
| 2004/0054791 A1 | 3/2004 | Chakraborty |
| 2004/0073668 A1 | 4/2004 | Bhat |
| 2004/0088560 A1 | 5/2004 | Danks |
| 2004/0128394 A1 | 7/2004 | Knauerhase |
| 2004/0267749 A1 | 12/2004 | Bhat |
| 2005/0021978 A1 | 1/2005 | Bhat |
| 2005/0149721 A1 | 7/2005 | Lu |
| 2005/0182773 A1 | 8/2005 | Feinsnnith |
| 2006/0015725 A1 | 1/2006 | Voice et al. |
| 2006/0053216 A1 | 3/2006 | Deokar |
| 2006/0233340 A1 | 10/2006 | Tovino |
| 2007/0124797 A1 | 5/2007 | Gupta |
| 2007/0130289 A1 | 6/2007 | Defazio et al. |
| 2007/0156659 A1 | 7/2007 | Lim |
| 2007/0169202 A1 | 7/2007 | Goldberg et al. |
| 2007/0174831 A1 | 7/2007 | Lee |
| 2007/0204337 A1 | 8/2007 | Schnackenberg et al. |
| 2007/0220599 A1 | 9/2007 | Moen |
| 2007/0226775 A1 | 9/2007 | Andreasen et al. |
| 2007/0234408 A1 | 10/2007 | Burch |
| 2007/0289006 A1 | 12/2007 | Ramachandran et al. |
| 2008/0066148 A1* | 3/2008 | Lim ............ H04L 67/42 726/1 |
| 2008/0080479 A1 | 4/2008 | Maes |
| 2008/0082834 A1 | 4/2008 | Mattsson |
| 2008/0126301 A1 | 5/2008 | Bank |
| 2008/0301437 A1 | 12/2008 | Chevalier |
| 2008/0307517 A1 | 12/2008 | Grigoriev |
| 2009/0048997 A1 | 2/2009 | Manickam et al. |
| 2009/0049512 A1 | 2/2009 | Manickam et al. |
| 2009/0307474 A1 | 12/2009 | Johnston |
| 2010/0024019 A1 | 1/2010 | Backlund |
| 2010/0064341 A1 | 3/2010 | Aldera |
| 2010/0281524 A1 | 11/2010 | Ghittino |
| 2011/0154473 A1 | 6/2011 | Anderson et al. |
| 2011/0161332 A1 | 6/2011 | Milman et al. |
| 2011/0209194 A1 | 8/2011 | Kennedy |
| 2011/0251992 A1 | 10/2011 | Bethlehem et al. |
| 2011/0313981 A1 | 12/2011 | Ben-Natan |
| 2012/0050005 A1 | 3/2012 | Shuster |
| 2012/0110632 A1 | 5/2012 | Burghart |
| 2012/0131164 A1 | 5/2012 | Bryan |
| 2012/0197919 A1 | 8/2012 | Chen et al. |
| 2012/0198467 A1 | 8/2012 | Jackson |
| 2012/0239540 A1 | 9/2012 | Rogers et al. |
| 2013/0117313 A1 | 5/2013 | Miao |
| 2013/0167192 A1 | 6/2013 | Hickman et al. |
| 2013/0219176 A1 | 8/2013 | Akella |
| 2013/0332982 A1 | 12/2013 | Rao et al. |
| 2014/0007186 A1 | 1/2014 | Agrawal et al. |
| 2014/0012833 A1 | 1/2014 | Humprecht et al. |
| 2014/0068699 A1 | 3/2014 | Balacheff |
| 2014/0090085 A1* | 3/2014 | Mattsson ............ G06F 21/6218 726/28 |
| 2014/0123266 A1 | 5/2014 | Carbou et al. |
| 2014/0128053 A1 | 5/2014 | Merchant |
| 2014/0152461 A1 | 6/2014 | Carlson |
| 2014/0165134 A1 | 6/2014 | Goldschlag |
| 2014/0173700 A1 | 6/2014 | Awan |
| 2014/0215322 A1 | 7/2014 | Gunderson |
| 2014/0229596 A1 | 8/2014 | Burke |
| 2014/0245372 A1 | 8/2014 | Elias |
| 2014/0259094 A1 | 9/2014 | Narayanaswanny |
| 2014/0304825 A1 | 10/2014 | Gianniotis |
| 2014/0351573 A1 | 11/2014 | Martini |
| 2015/0055481 A1 | 2/2015 | Guo et al. |
| 2015/0067881 A1 | 3/2015 | Badstieber et al. |
| 2015/0113010 A1 | 4/2015 | Muthyala et al. |
| 2015/0128205 A1 | 5/2015 | Mahaffey |
| 2015/0221045 A1 | 8/2015 | Heckler |
| 2015/0324600 A1 | 11/2015 | Sethi et al. |
| 2015/0365401 A1 | 12/2015 | Brown et al. |
| 2015/0381660 A1 | 12/2015 | Hsiung |
| 2016/0019402 A1 | 1/2016 | Khandelwal |
| 2016/0080356 A1 | 3/2016 | Chougle et al. |
| 2016/0149859 A1 | 5/2016 | Curtis |
| 2016/0210578 A1 | 7/2016 | Raleigh et al. |
| 2016/0217293 A1 | 7/2016 | Farkash et al. |
| 2016/0277368 A1 | 9/2016 | Narayanaswanny |
| 2016/0300231 A1 | 10/2016 | Shavell et al. |
| 2016/0342803 A1 | 11/2016 | Goodridge |
| 2016/0366220 A1 | 12/2016 | Gottlieb et al. |
| 2017/0012962 A1 | 1/2017 | Lissack |
| 2017/0085534 A1 | 3/2017 | Iyer et al. |
| 2017/0093916 A1 | 3/2017 | Arumugam et al. |
| 2017/0093925 A1 | 3/2017 | Sheretov |
| 2017/0132186 A1 | 5/2017 | Plummer |
| 2017/0208033 A1 | 7/2017 | Roskind |
| 2018/0131727 A1 | 5/2018 | Arumugam et al. |
| 2020/0259793 A1 | 8/2020 | Pangeni et al. |

OTHER PUBLICATIONS

"Office Action Issued in Israel Patent Application No. 258426", dated Dec. 16, 2019, 3 Pages. (W/o English Translation).

International Application No. PCT/US2016/065853, Notification of Transmittal of the International Search Report and the Written Opinion of the International Searching Authority, dated Mar. 24, 2017, 14 pages.

International Application No. PCT/US2016/054107, Notification of Transmittal of the International Search Report and the Written Opinion of the International Searching Authority, dated Jan. 9, 2017, 13 pages.

Extended European Search Report in European Application No. 16852450.2, dated Jul. 3, 2018, 8 pages.

EP Extended European Search Report in European Application No. 16873927.4, dated Oct. 22, 2018, 7 pages.

"Non Final Office Action Issued in U.S. Appl. No. 14/868,265", dated Jul. 12, 2017, 28 Pages.

(56) References Cited

OTHER PUBLICATIONS

"Non Final Office Action Issued in U.S. Appl. No. 14/965,055", dated Jun. 1, 2017, 23 Pagers.
"Non Final Office Action Issued in U.S. Appl. No. 15/864,886", dated Sep. 6, 2018, 21 Pages.
"Notice of Allowance Issued in U.S. Appl. No. 15/864,886", dated Mar. 5, 2019, 21 Pages.
"Non Final Office Action Issued in U.S. Appl. No. 16/397,750", dated Aug. 7, 2019, 20 Pages.
"Non Final Office Action Issued in U.S. Appl. No. 16/397,750", dated Jun. 11, 2020, 28 Pages.
"Notice of Allowance Issued in U.S. Appl. No. 16/397,750", dated Dec. 2, 2020, 12 Pages.
"Office Action Issued in Australia Patent Application No. 2016332734", dated Dec. 11, 2020, 4 Pages.

* cited by examiner

POLICY ENFORCEMENT FOR COMPUTE NODES

BACKGROUND

A framework, e.g., Apache Hadoop, can be deployed to manage distributed storage and distributed processing of large data sets on clusters of many computers, i.e., nodes, which may be physical or virtual. The framework can include multiple components to be run on different nodes in the cluster. Each component can be responsible for a different task. For example, a first component, e.g., Hadoop Distributed File System (HDFS), can implement a file system, and a second component, e.g., Hive, can implement a database access layer. The components work together to distribute processing of a workload of files among the nodes in the cluster.

A third component, e.g., YARN, of the framework can break up the workload into multiple tasks. In particular, the third component is a resource manager that assigns each task to a respective compute node in the cluster that performs computations of the task. Each compute node can retrieve a portion of data required for the task from the file system before executing a process that uses the portion of data to complete the task.

SUMMARY

In general, this specification describes a policy enforcement system.

In one aspect, a method includes maintaining, by a policy enforcement system in a first compute node, a plurality of policies and data associating a plurality of user credentials with the plurality of policies. A request is received from a compute process for data from a file system in the first compute node for use in a first task assigned to the first compute node by a resource manager managing a plurality of tasks comprising the first task and a plurality of compute nodes comprising the first compute node. The request includes user credentials. The request for data is sent to the file system, and the data is received from the file system. Based on the received user credentials and the data associating the plurality of user credentials with the plurality of policies, one or more policies that correspond to the received user credentials is selected from the plurality of policies. The policy enforcement system filters the data from the file system based on the one or more policies, and sends the filtered data to the compute process.

In another aspect, a computer-readable medium having instructions stored thereon, which, when executed by a processor, cause the processor to perform operations to perform method.

Features of either aspect may include one or more of the following. The one or more policies may cause the policy enforcement system to only include, in the filtered data, data accessible using the user credentials. The data from the file system may be organized by a table of columns and rows. Filtering the data from the file system may include determining, based on the one or more policies associated with the user credentials, that one or more columns of data in the table are restricted, and masking at least a portion of one or more columns of data. The masking may include encrypting or tokenizing the data. The masking may mask some data in a column and leave some data unmasked. Filtering the data from the file system may include determining, based on the one or more policies associated with the user credentials, that one or more rows of data in the table are restricted, and masking the one or more rows of data. The masking may include not returning the one or more masked rows to the compute process. The user credentials may include a user id and a group id, and the user id may associated with a first collection of policies, and the group id may be associated with a second collection of policies. Prior to the storing, user input may be received at a user interface associated with the policy enforcement system, the user input specifying one or more policies associated with the user credentials.

In another aspect, a system includes a client device and a file system that includes a master node and a plurality of compute nodes. The master node is configured to receive from the client device a request for data from the file system and divide a workload from the request into a plurality of tasks and assign the tasks to the plurality of compute nodes. Each compute node includes a processor and a computer-readable medium coupled to the processor and having instructions stored thereon, which, when executed by the processor, cause the processor to operating a compute process and a policy enforcement system. The instructions cause the processor to perform operations as follows. A first task is received at the compute process from the master node. A plurality of policies and data associating a plurality of user credentials with the plurality of policies are maintained by the policy enforcement system. A request for data from a file system in the compute node for use in the first task is received in the policy enforcement system from the compute process. The request includes user credentials. The request for data is sent from the policy enforcement system to the file system. The data from the file system is received in the policy enforcement system. Based on the received user credentials and the data associating the plurality of user credentials with the plurality of policies, one or more policies that correspond to the received user credentials is selected from the plurality of policies. The data from the file system is filtered by the policy enforcement system based on the one or more policies. The filtered data is sent from the policy enforcement system to the compute process, and a result is returned from the compute process in the compute node to the master node.

Features may include one or more of the following. The data from the file system may be organized by a table of columns and rows. Filtering the data from the file system may include determining, based on the one or more policies associated with the user credentials, that one or more columns or rows of data in the table are restricted, and masking at least a portion of one or more columns or rows of data. The masking may include encrypting or tokenizing data in one or more columns. The masking may include not returning one or more rows to the compute process.

Particular embodiments of the subject matter described in this specification can be implemented so as to realize one or more of the following advantages. Traditionally, a compute node is able to retrieve, or in some cases modify, data from a file system as long as the compute node has proper read or write access. With proper access permissions, the file system returns the data without any filters or modifications. Using policies, the policy enforcement system can mask particular portions of the returned data that may be sensitive, e.g., personally identifiable information such as social security numbers or dates of birth. In addition, the policy enforcement system can filter out certain records based on the data in the record, e.g., a policy could allow only access to records record with field State having value 'CA'. This can provide an additional layer of privacy for user data stored in the file system. Also, when communicating with the file system, the system operates without interfering with existing communication protocols between a client and nodes within the file system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Sensitive data, such as personally identifiable data, can be stored in a file system, e.g., HDFS, in the cloud. Compute nodes in the cluster can operate on the sensitive data retrieved from the file system to complete tasks within a workload. There can be restrictions to read or write access for some compute nodes due to the sensitivity of the data. Some database systems can, in response to a data request from a client without authorized user credentials, send a response indicating unauthorized access to the data; such gatekeeping is performed at the central server that receives the request from the client. However, for a system that has distributed storage and processing, e.g., HDFS, it can be desirable for policies to be enforced at each compute node. In addition, it can be desirable for a compute node to receive a modified version of the data instead of a response indicating unauthorized access. For example, it can be desirable for the compute node to receive a response in which some (but not all) of the data has been masked, e.g., characters replaced with a default characters or values.

Thus, a policy enforcement system integrated in a compute node can provide a masked version of the sensitive data. This can enable the compute node to access portions of the sensitive data without having the sensitive data be entirely exposed. The system is operable even where data is stored in a framework, e.g., HDFS, that includes name nodes and data nodes.

Figure 1:
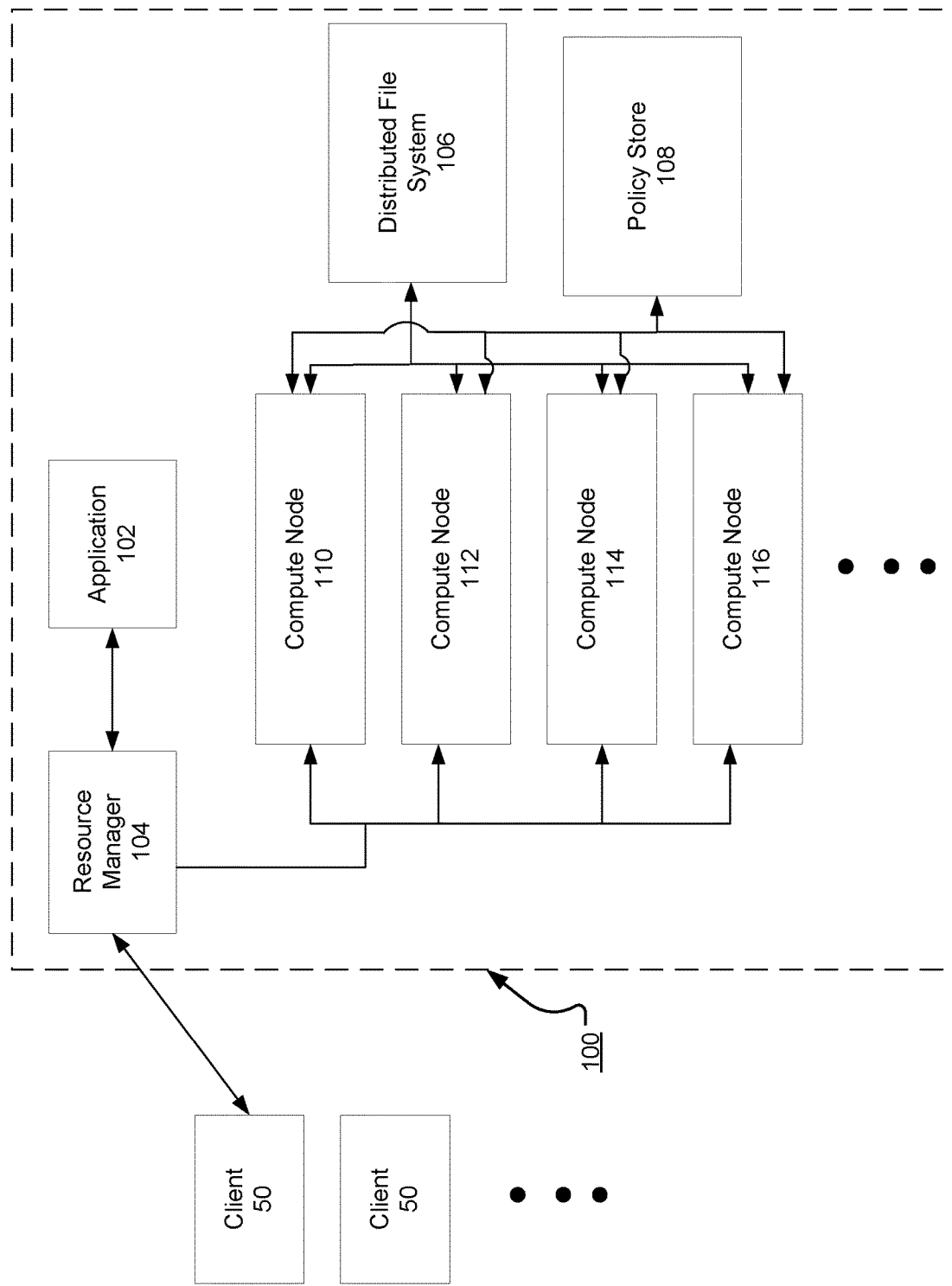
FIG. 1 illustrates an example architecture for distributing tasks to compute nodes.

FIG. 1 illustrates an example architecture of a file system 100 for distributing tasks to compute nodes 110-116. One or more client devices 50 can communicate with the file system 100. The client device 50 can include a memory, e.g., a random access memory (RAM), for storing instructions and data and a processor for executing stored instructions. The memory can include both read only and writable memory. For example, the client device 50 can be a computer coupled to the file system 100 through a data communication network, e.g., local area network (LAN) or wide area network (WAN), e.g., the Internet, or a combination of networks. Communication over the network can occur using TCP/IP protocols.

The client device 102 can submit a job to the file system 100. The job can involve various tasks that are either spread across multiple compute nodes 110-116.

An application 102 can be running on one or more nodes within a cluster. Each node can include a memory, e.g., a random access memory (RAM), for storing instructions and data and a processor for executing stored instructions. The memory can include both read only and writable memory. The application 102 can be configured to process workloads. For example, the application 102 can be configured to perform an aggregation operation on a large dataset.

A resource manager 104, which can serve as a master node, can analyze the workload provided to the application 102 and divide the workload into multiple tasks. The resource manager 104 assigns each task to a respective compute node, e.g., one of compute nodes 110-116. For example, the resource manager 104 can receive the job from the client 50, and divide the job into multiple individual tasks. The resource manager 104 can allocate the tasks so that each task operates on an independent portion of data from a file system. Each independent portion of the data can be located in a different compute node. The compute nodes complete their assigned tasks, and in some implementations, return a result to the application 102, e.g., to the resource manager 104. The application 102 can communicate with each compute node through a data communication network, e.g., local area network (LAN) or wide area network (WAN), e.g., the Internet, or a combination of networks. Communication over the network can occur using TCP/IP protocols.

The resource manager 104 can return the result of the job to the client device 50. To perform an assigned task, a compute node communicates with a distributed file system 106. The distributed file system 106 provides a portion of data required for completing the assigned task. The compute node can then perform operations on the portion of data as specified by the application 102.

Each compute node can include a policy enforcement system. The policy enforcement system can communicate with a policy store 108, which maintains policies within the cluster. The compute node and the policy enforcement system will be described further below with reference to FIG. 2.

Policies limit access to portions of data stored in the distributed file system 106. By way of illustration, data in the distributed file system 106 can be stored in a table of rows and columns. Some columns in the table may include data about, e.g., names, dates of birth, phone numbers, credit card information, social security numbers, or other personal information. The rows can include data about the individuals, e.g. sorted by unique identifier. Some policies allow user credentials of one particular person to access data from a column, or can allow user credentials of a group of people to access data from a column. Some other policies prevent any user from accessing complete data from a column. Policies can restrict access to these columns in the data to users with approved user credentials. This will be described in further detail with reference to FIG. 3. In some implementations, policies are applicable to other formats for the data. The other formats can include unstructured data, key-value stores, document stores, or graphs.

Thus, each policy can be associated with user credentials of one or more users. Multiple user credentials can also be associated with one policy. User credentials can include a user identification, a group identification, or both. In some implementations, the user identification is associated with a first collection of policies and the group identification is associated with a second collection of policies. These policies can be stored in the policy store 108. An example policy can be a data structure that specifies a policy identifier, a column, and a function to be executed on the column, e.g., mask everything except the last four characters of data in the column. An example association can be stored in a table with a column for a user credential identifier and a column for a policy identifier with a user credential identifier associated with the policy identifier in the same row.

In some implementations, an administrator can generate a policy using a user interface that communicates with the policy store 108. The administrator can provide, at the user interface, user input specifying one or more policies associated with particular user credentials, and the policy store 108 can store the one or more policies and the associations.

Figure 2:
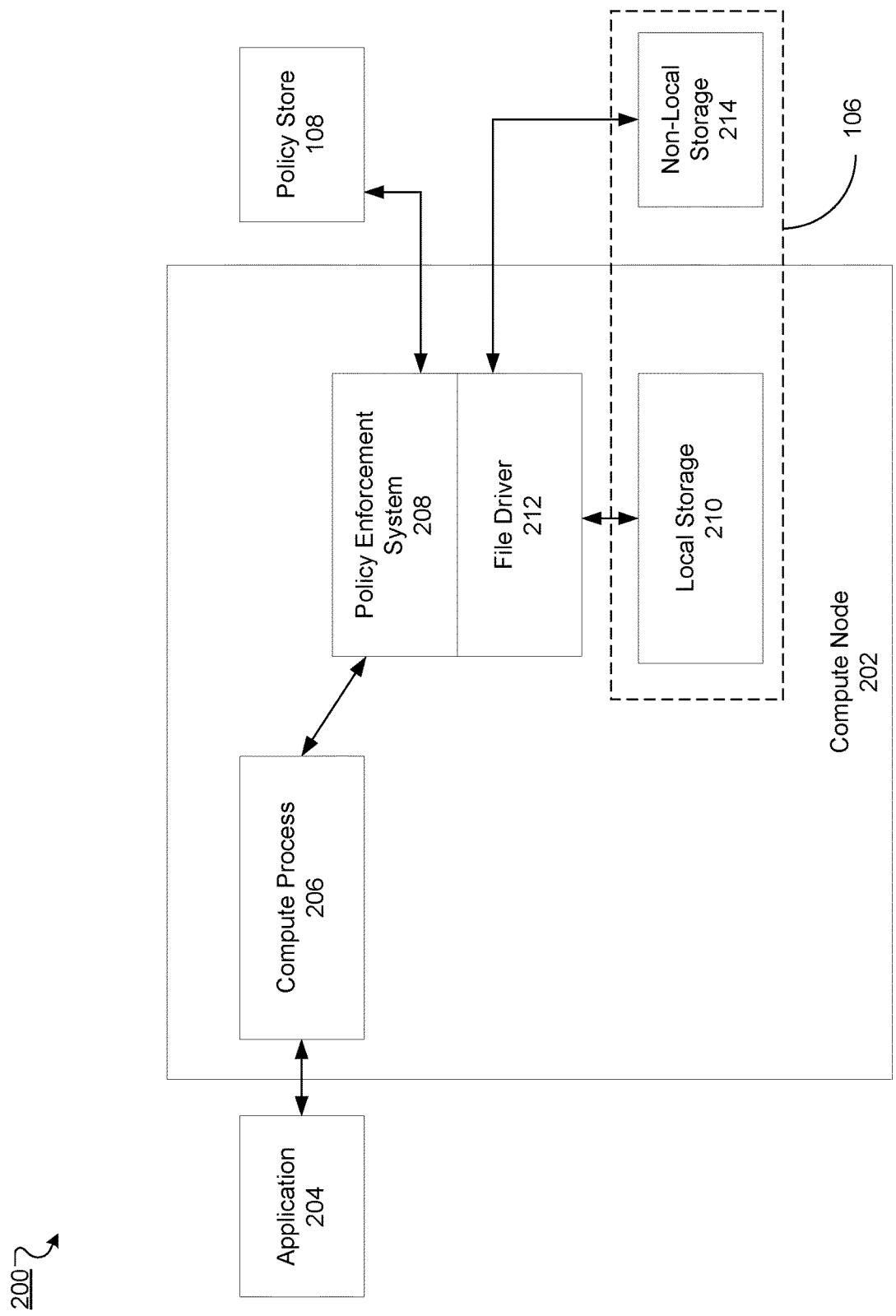
FIG. 2 illustrates an example architecture for integrating a policy enforcement system in a compute node.

FIG. 2 illustrates an example architecture 200 for integrating a policy enforcement system 208 in a compute node 202. The compute node 202 can be an example of any of the compute nodes 110-116.

A user can send a request to an application 204 to process a workload divided into multiple tasks. The request can include user credentials. The application 204, or alternatively, a resource manager, can assign a task of the workload to the compute node 202. The application 204 can provide the user credentials to the compute node 202. In some implementations, a policy enforcement system 208 stores the user credentials in an internal database for later use.

In some implementations, the user credentials stored in the internal database are independent of or in addition to user credentials in the distributed file system 214 and the application 204. That is, the policy enforcement system 208 can manage, e.g., through the user interface, user credentials that are not managed by the distributed file system 214 or the application 204. In some implementations, the user credentials at the policy enforcement system 208 have group identifiers or category identifiers. Policies can apply a masking function, which will be described below, to data associated with user credentials of particular group or category identifiers.

The policy enforcement system 208 communicates with the policy store 108 to obtain policies associated with the user credentials stored in the internal database. The policy enforcement system 208 can store the policies in the internal database and associations of the one or more of the policies with the user credentials.

The application 204 can communicate with a compute process 206. The compute process 206 executes on the compute node 202 to complete the assigned task from the application 204. To complete the task, the compute process 206 obtains data from a policy enforcement system 208, which intercepts data from a file driver 212.

The file driver 212 communicates with the distributed file system 106. In some implementations, the file driver 212 obtains a portion of data from "local" storage 210, i.e., storage for the distributed file system 106 that is logically associated with the compute node 202. The local storage can be a physical or virtual drive associated with the particular compute node 202. In some implementations, the file driver 212 obtains a portion of data from the non-local storage 214, e.g., a physical or virtual drive associated with another node.

To complete the task, the compute process 206 requests the portion of data from the distributed file system 106. The policy enforcement system 208 can perform operations on the portion of data before providing the portion of data to the compute process 206. The operations performed by the policy enforcement system 208 will be described further below with reference to FIG. 3.

In some implementations, the policy enforcement system 203 operates between the distributed file system 214 and the compute node 202.

Figure 3:
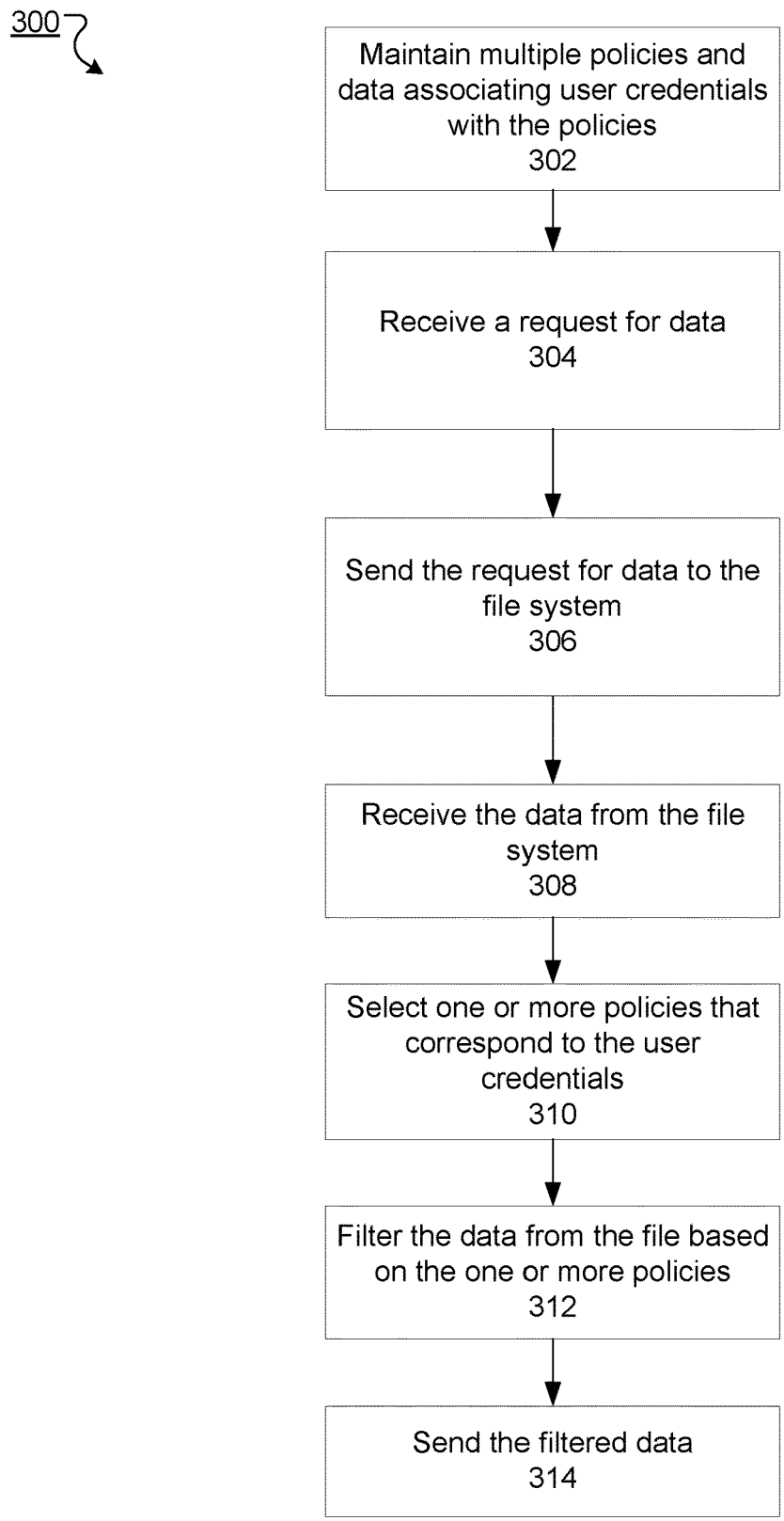
FIG. 3 is a flow diagram of an example method for completing a task using the policy enforcement system.

FIG. 3 is a flow diagram of an example method 300 for completing a task using the policy enforcement system. For convenience, the method 300 will be described with respect to a policy enforcement system, e.g., the policy enforcement system 208 of FIG. 2, executing software to implement the method 300.

The policy enforcement system maintains multiple policies and data associating user credentials with the multiple policies (step 302). The policies can be stored in an internal database as described above or obtained from a policy store, e.g., the policy store 108 of FIG. 2. The resource manager, can receive a job from a client. The application, e.g., the resource manager, sends a request for data to be retrieved from a file system, e.g., a distributed file system 214 of FIG. 2, for use in a task assigned to a compute node. The compute node can receive the request at a compute process, e.g., the compute process 206 of FIG. 2. The compute process can provide the request to the policy enforcement system, e.g., through a file system interface command, and the policy enforcement system receives the request (step 304). The request includes user credentials.

The policy enforcement system sends the request for data to the file system (step 306). In some implementations, the policy enforcement system sends the request for data to a file driver, as described above with reference to FIG. 2, and the file driver sends the request to the file system. In particular, the policy enforcement system sends the request for data to the local file system 210 within the node. For example, the tasks may be divided by the resource manager according to which compute node contains data to be access by the task; thus the policy enforcement system of a particular node need not access the local storage data of any other node.

In some implementations, the file system authenticates the request using the user credentials, and if the user credentials are valid, provides the data to the policy enforcement system. In some other implementations, the file system provides the data to the policy enforcement system without authenticating the request. The policy enforcement system can store the data in a local file system. Thus, the policy enforcement system receives the data from the file system (step 308).

The policy enforcement system selects, from multiple policies stored at the compute node or from a policy store, e.g., policy store 108 of FIG. 2, one or more policies that correspond to the received user credentials based on the received user credentials and the data associating the user credentials with the multiple policies (step 310). By way of illustration, if a particular request includes a user credential that is associated with a first policy and a policy store has five different policies, the policy enforcement system selects the first policy based on the request. In some implementations, the policy enforcement system generates a structured query language (SQL) query that retrieves the policies associated with an identifier for the user credentials.

The policy enforcement system filters the data from the file system based on the one or more policies (step 312). For example, the policy enforcement system can iterate through each row entry in the data retrieved from a local or distributed file system and can execute a function, e.g., a string replace, as specified by the one or more policies.

By way of illustration, the data from the file system can be organized in a table of rows and columns in Table 1.

TABLE 1

| Name | social-security-number | date-of-birth |
|---|---|---|
| John Smith | 123-45-6789 | 12-34-56 |
| Jane Smith | 111-22-3333 | 11-22-33 |

The one or more policies can specify one or more columns of the table that are restricted. For example, the one or more policies can specify columns named "social-security-number" or "date-of-birth" should be masked.

The policy enforcement system can filter the data by masking a portion of the columns. The policy can specify the portion to be masked. Any characters in the masked portion of the column can be replaced by masking characters, e.g., 'x', '*' or '#'.

The policy can also have a predicate that determines whether the data is filtered or not. For example, the predicate can be whether the data has a particular regular expression in a programming language like JavaScript. If the predicate evaluates to true, the policy enforcement system can mask the data. In some implementations, the policy enforcement system also encrypts or tokenizes the data before sending the data to the compute process, e.g., using a custom encryption or tokenization function.

In some implementations, the policy enforcement system can filter the data such certain records are not returned to the client. Thus, if the predicate evaluates to true for a row, that is removed from the data returned to the client. For example a policy could allow only access to records record with field State having value 'CA'.

By way of illustration, the policy can specify for a "social-security-number" column that only a last four characters can be provided to the compute process and that for a "date-of-birth" column only the year can be provided to the compute process. Therefore, the policy enforcement system can replace any character that is not in the last four characters with an 'x'. See Table 2.

TABLE 2

| name | social-security-number | date-of-birth |
| --- | --- | --- |
| John Smith | xxx-xx-6789 | xx-xx-56 |
| Jane Smith | xxx-xx-3333 | xx-xx-33 |

The policy enforcement system can also filter the data by simply not returning one or more columns. For example, a policy can specify that "social-security-number" column will not be provided to the compute process.

In some implementations, the policy enforcement system can also enforce file level operations such as read, write, create, delete, etc., based on the policies. If a particular user does not have authorization to execute the operation on entire file, e.g., the policy does not authorized the operation for the provided the credentials, then the request could be rejected immediately. In this case, the policy enforcement system can return an error to the compute node. This can enable an administrator to store all access control policies at a variety of degrees of granularity (coarse grain file level access, as well as fine grain filter/masking of data) in single policy enforcement system.

The policy enforcement system then sends the filtered data to the compute process (step 314). In this way, the policy enforcement system, as integrated with a compute node, does not interfere with existing file retrieval protocols between compute nodes and file systems. The compute process can then return the filtered data to the application.

As described above, in the response returned to the compute, some (but not all) of the data has been masked, e.g., characters replaced with a default characters or values. In addition, because the policies can be associated with individual users, different users can receive responses with different masking. For example, a first user might not be allowed to see any portion of a credit card number (so all digit of the credit card number would be masked), a second user might be allowed to see the last 4 digits (so the remaining digits would be masked), and a third user might be permitted to see the whole credit card number. By masking the data differently based on the policies, all users can run the same applications that read the full data records. The data each user sees will depend on their access privileges.

Also, the policy enforcement system can provide an additional level of security without requiring the compute process to handle a different data structure, which minimizes cost and complexity of integrating the policy enforcement system. By way of illustration, the compute process expects a data structure with three columns based on request for data from "name", "social-security-number", and "date-of-birth" columns. The policy enforcement system can provide a data structure with the "name", "social-security-number", and "date-of-birth" columns, although data within the columns are masked.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method in a policy enforcement system, the method comprising:
    receiving from a process that performs a task on a compute node including one or more processors, a request for data, the request being associated with user credentials provided to the process by an application executing on a client device, wherein the compute node comprises a node of a distributed computing system that includes a plurality of nodes configured to handle a workload of the application, the workload divided into a plurality of tasks distributed among the plurality of nodes, the plurality of the tasks including the task;
    obtaining from a policy store storing a plurality of policies, one or more policies associated with the user credentials, the one or more policies specifying data masking rules that are specific to the user;
    intercepting data submitted to the process by a file driver that executes on the compute node, the intercepting including:
        forwarding the request for the data to the file driver that fetches the data from a file system in response to the request; and
        receiving the data submitted by the file driver to the process;
    masking according to the data masking rules of the one or more policies, at least a portion of the data submitted by the file driver; and
    sending the data having the portion masked to the process and wherein the policy enforcement system is logically positioned between the file driver and the process.

2. The method of claim 1, wherein the user credentials are different from credentials of the user for accessing the application or for accessing the file system.

3. The method of claim 1, wherein the file system is an internal file system within the compute node or an external file system.

4. The method of claim 1, wherein the one or more policies include a predicate that determines whether the data is masked based on evaluation of the predicate.

5. The method of claim 1, wherein the policy enforcement system enforces file level operations based on the user credentials that are different from credentials of the user for accessing the file system, the file level operations includes at least one of read, write, create or delete.

6. The method of claim 1, wherein the masking including redacting a column of data, redacting a row of data, or both.

7. The method of claim 6, wherein the masking a row of data comprises:
    removing the row of data from the data submitted by the file driver to the process, the data having the portion masked thereby not including the masked row of data.

8. The method of claim 1, wherein the data masking rules preserve format of the data and replaces value of the data with one or more masks.

9. The method of claim 1, wherein the data from the file driver is already masked, and the masking includes decrypting the masked data according to the user credentials.

10. A non-transitory computer-readable medium having instructions stored thereon, which, when executed by a processor, cause the processor to perform operations in a policy enforcement system comprising:
    receiving from a process that performs a task on a compute node including one or more processors, a request for data, the request being associated with user credentials provided to the process by an application executing on a client device wherein the compute node is a node of a distributed computing system that includes a plurality of nodes configured to handle a workload of the application, the workload being divided into a plurality of tasks distributed among the plurality of nodes, the plurality of the tasks including the task;
    obtaining from a policy store storing a plurality of policies, one or more policies associated with the user credentials, the one or more policies specifying data masking rules that are specific to the user;
    intercepting data submitted to the process by a file driver that executes on the compute node, the intercepting including:
        forwarding the request for the data to the file driver that fetches the data from a file system in response to the request; and
        receiving the data submitted by the file driver to the process;
    masking according to the data masking rules of the one or more policies, at least a portion of the data submitted by the file driver; and
    sending the data having the portion masked to the process, wherein the policy enforcement system is logically positioned between the file driver and the process.

11. The non-transitory computer-readable medium of claim 10, wherein the one or more policies include a predicate that determines whether the data is masked based on evaluation of the predicate.

12. The non-transitory computer-readable medium of claim 10, wherein the policy enforcement system enforces file level operations based on the user credentials that are different from credentials of the user for accessing the file system, the file level operations includes at least one of read, write, create or delete.

13. The non-transitory computer-readable medium of claim 10, wherein the data masking rules preserve format of the data and replaces value of the data with one or more masks.

14. The non-transitory computer-readable medium of claim 10, wherein the data from the file driver is already masked, and the masking includes decrypting the masked data according to the user credentials.

15. The non-transitory computer-readable medium of claim 10, wherein the masking includes redacting at least one of a column of data or a row of data.

16. A policy enforcement system comprising:
    a processor; and
    a non-transitory computer-readable medium having instructions stored thereon, which, when executed by the processor, cause the processor to perform operations comprising:
    receiving from a process that performs a task on a compute node including one or more processors, a request for data, the request being associated with user credentials provided to the process by an application executing on a client device, wherein the compute node is a node of a distributed computing system that includes a plurality of nodes configured to handle a workload of the application, the workload being divided into a plurality of tasks distributed among the plurality of nodes, the plurality of the tasks including the task;
    obtaining from a policy store storing a plurality of policies, one or more policies associated with the user credentials, the one or more policies specifying data masking rules that are specific to the user;

intercepting data submitted to the process by a file driver that executes on the compute node, the intercepting including:

forwarding the request for the data to the file driver that fetches the data from a file system in response to the request; and receiving the data submitted by the file driver to the process;

masking according to the data masking rules of the one or more policies, at least a portion of the data submitted by the file driver; and sending the data having the portion masked to the process, wherein the policy enforcement system is logically positioned between the file driver and the process.

17. The policy enforcement system of claim 16, wherein the one or more policies include a predicate that determines whether the data is masked based on evaluation of the predicate.

18. The policy enforcement system of claim 16, wherein the policy enforcement system enforces file level operations based on the user credentials that are different from credentials of the user for accessing the file system, the file level operations includes at least one of read, write, create or delete.

19. The policy enforcement system of claim 16, wherein the data masking rules preserve format of the data and replaces value of the data with one or more masks.

20. The policy enforcement system of claim 16, wherein the masking includes redacting at least one of a column of data or a row of data.

* * * * *